Oct. 28, 1930.  L. BRÉGUET  1,779,898
RADIATOR SYSTEM FOR AIRSHIPS
Filed Sept. 14, 1929  3 Sheets-Sheet 1
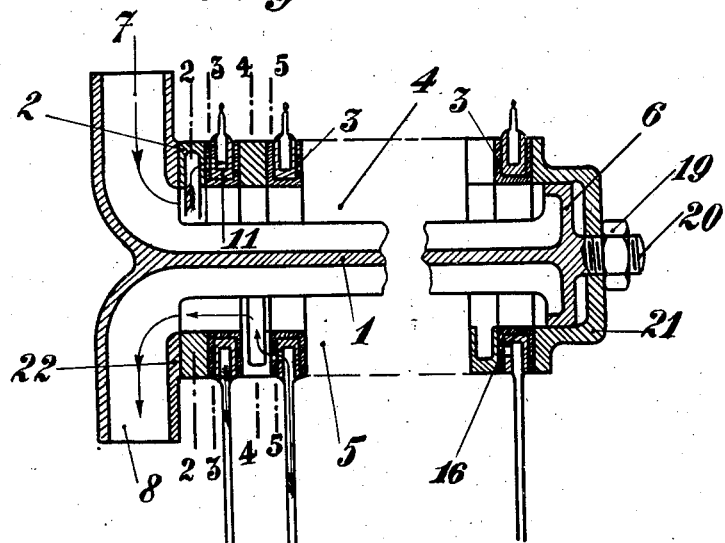
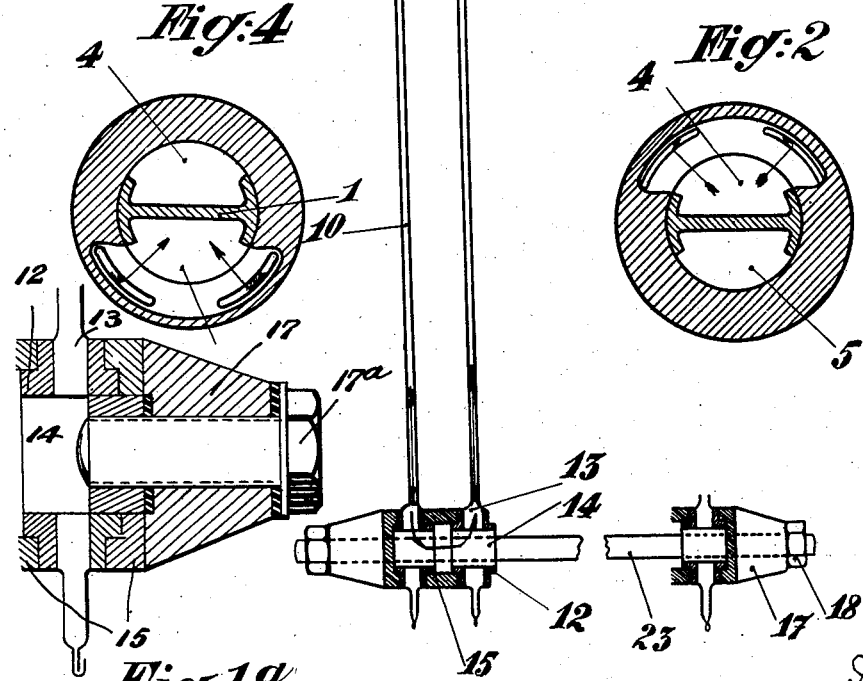

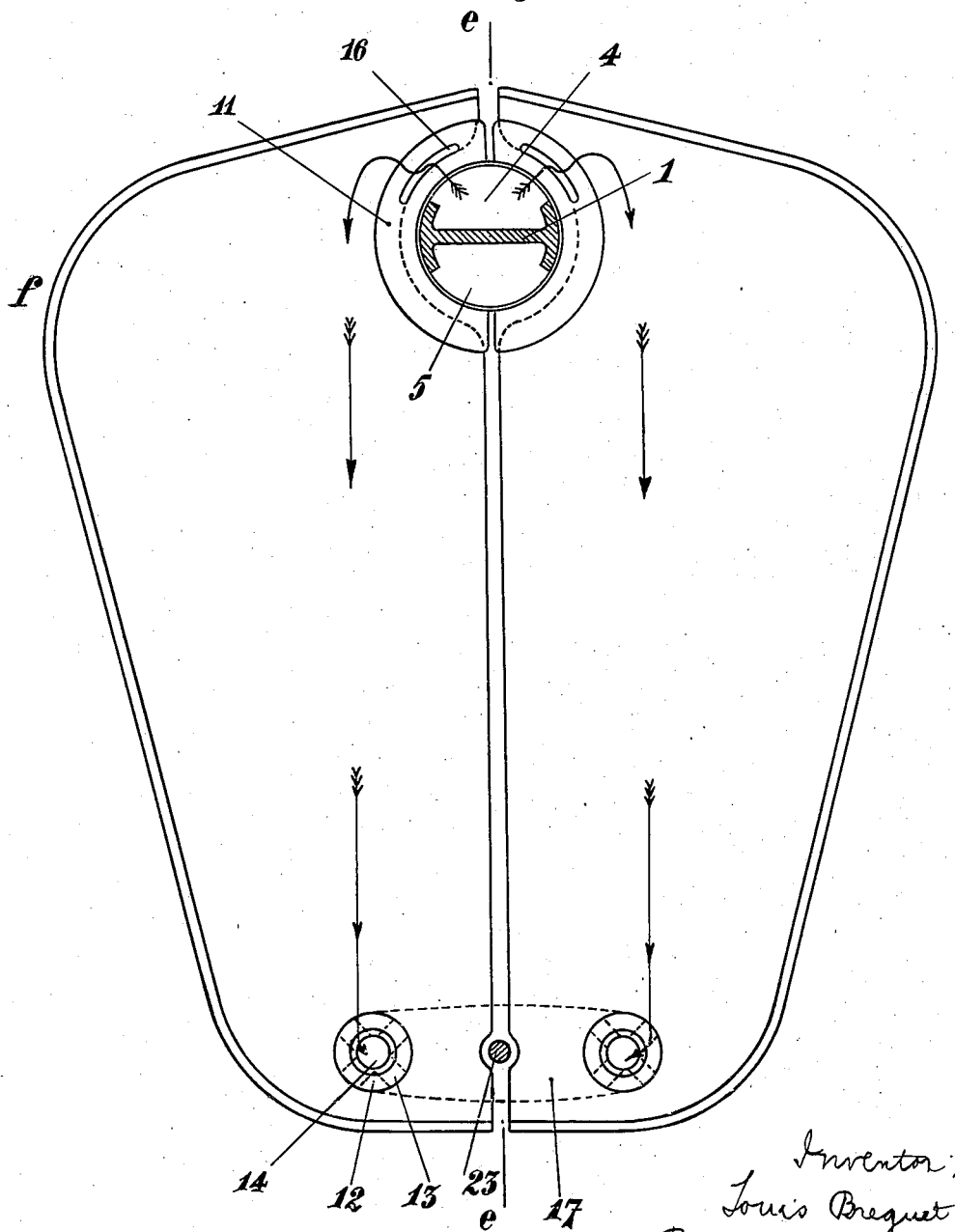

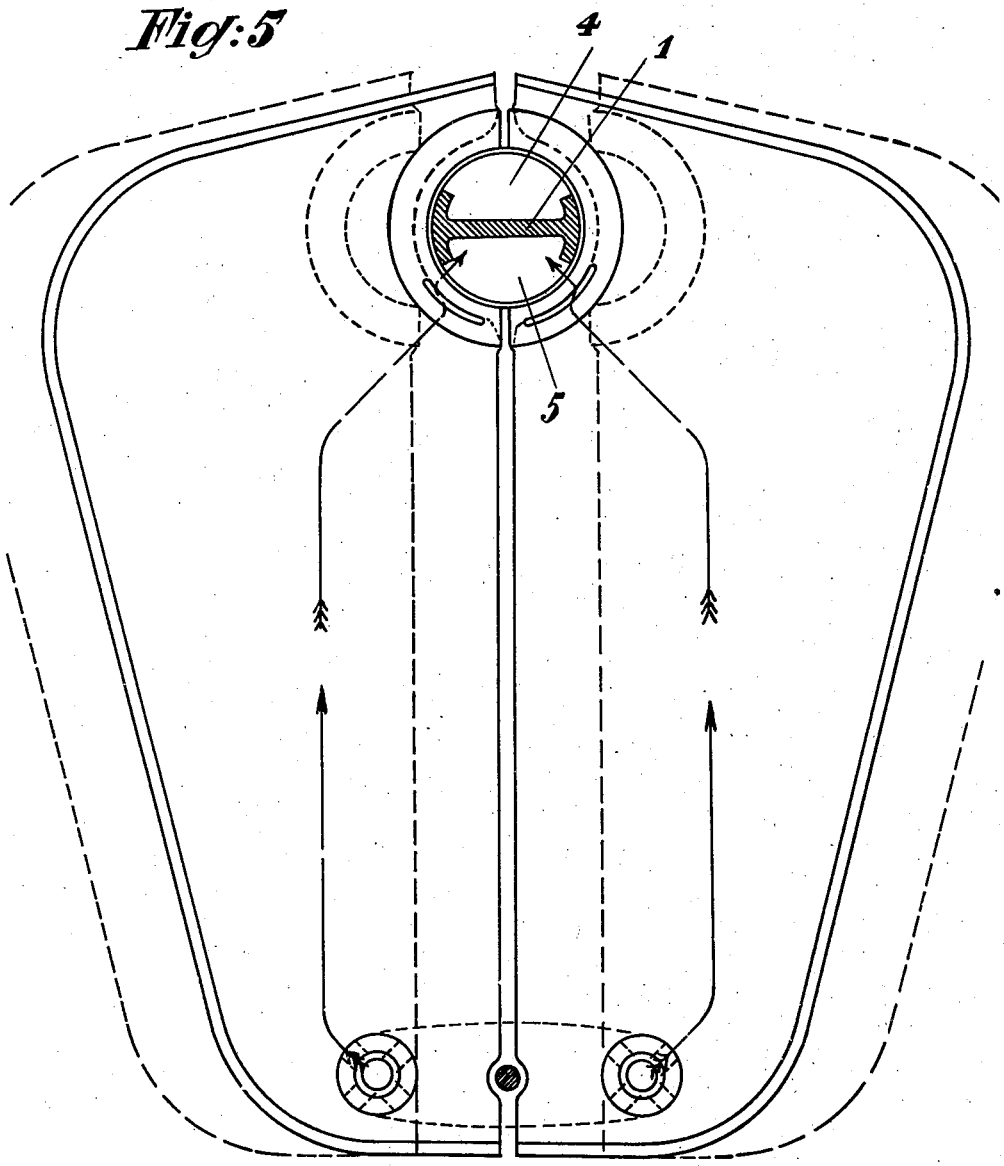

Patented Oct. 28, 1930

1,779,898

UNITED STATES PATENT OFFICE

LOUIS BRÉGUET, OF PARIS, FRANCE, ASSIGNOR TO SOCIETE ANONYME DES ATELIERS D'AVIATION LOUIS BREGUET, OF PARIS, FRANCE, A COMPANY OF FRANCE

RADIATOR SYSTEM FOR AIRSHIPS

Application filed September 14, 1929, Serial No. 392,613, and in France October 5, 1928.

The present invention has for an object a radiator having blades more particularly applicable to aviation and characterized principally by the demounting and assembly immediately of the blades in a way to allow rapid replacement of one of them in case of damage. Said operation takes place on the spot by simple loosening of screws without necessitating dismounting of any joints or other members than the element to be changed.

To this end, the radiator includes essentially a series of distributers and alternate blades simply threaded and clamped on a central member deliminating two collectors, one for the inlet and the other for the outlet of water and the latter cannot pass from one collector to another but through the medium of distributers and the blades of the radiator where it is cooled by the air circulating through said blades.

In the embodiment provided according to the invention, the successive blades are alternatively connected by distributers to one and the other collectors and communicate between each other by orifices which thus oblige the water for cooling to traverse at least two of the blades between the inlet and outlet collectors.

In the drawing—

Fig. 1 illustrates an assembly view of the radiator in section;

Fig. 1ª is a detail view of the draining plugs.

Fig. 2 is a section along the line 2—2 of Fig. 1;

Fig. 3 is a section along the line 3—3 of Fig. 1;

Fig. 4 is a section along the line 4—4 of Fig. 1;

Fig. 5 is a section along the line 5—5 of Fig. 1.

On a member 1 having the general shape of a T whose branches are curved are alternate threaded circular distributers such as 2 and joint members likewise circular such as 3. Said distributers and said joint members are bored interiorly at a suitable diameter for adjusting on the arms of the member 1.

On the other hand, the member 1 is provided at one extremity with a shoulder 22 and at the other extremity with a disk of solid character 6 and a threaded lug 20. A nut 19 allows clamping the series of distributers and joint members together through the medium of a cap 21 sliding on the plate 6.

Due to these arrangements the piling up of the distributers and joint members delimits a cylinder of hollow nature rendered tight by clamping the whole and divided by the core of the member 1 into two halves 4 and 5 which can play the part of collector. It results therefrom that the fluid penetrating the collector 4 for example, through a tube such as 7 cannot come into the collector 5 but by passing through the blades of the radiator along the circuit hereinafter described.

The blades of the radiator such as 10 (left half of Fig. 3) are constituted for example by thin sheet metal bent back on itself along the edge e—e (Fig. 3) then riveted, hooked or soldered on the other edges e, f, e which are given the form desired. A hollow half ring such as 11 disposed in the region upward of the rectilinear vertical edge, can be soldered flush on the sheet metal or fixed thereon by any other process assuring tightness. Said hollow half rings are dimensioned in a way as to be introduced exactly in the half joint member such as 3. It results that the two blades symmetrically disposed with respect to each other and in the same plane as illustrated in Fig. 3 become both fitted in the same circular joint member.

The hollow half rings 11, the joint members 3 and the distributers 2 provided with openings such as 16 opposite each other and placed alternately at the upper part (Fig.

3) and the lower part (Fig. 5) in a way that the blades are alternately in communication with the collector 4 and the collector 5 of the central conduit.

Finally, each blade is furnished at its lower part with a tubular member 12 pierced laterally with holes such as 13 opening into the interior of the member 14 in a way to allow communication of a blade with the adjacent ones. Said members fit in the joint members 15.

Between the two groups of blades disposed symmetrically passes a rod 23 threaded at its extremities and which assures tightness of the two series of joint members which separate the blades from each other by clamping of the whole established by means of the nut 18 and flanges 17.

The radiator being thus assembled, the circulation of liquid to be cooled takes place as follows:

The liquid is introduced into tube 7 and penetrates into the collector 4 then through the distributers whose orifices open in the collector, such for example the distributers having uneven numbers if they be numbered from left to right, through the holes corresponding thereto the liquid penetrates into the blades having the uneven numbers (same numbering as the distributers) and runs from the top towards the bottom. It thus attains the lower tubular members through which it penetrates the blades having even numbers in which it rises towards the top. The blades having even numbers having their orifices uppermost in communication with the collector 5 only (Fig. 5) the liquid thus attains collector 5 and runs through the outlet tube 8.

This type of radiator allows immediate dismounting of an element not in use. It is merely necessary for this purpose to loosen the nut 20 and the nut 18 in order to be able to laterally disengage a blade and replace it by a blade in good condition and then tighten the two nuts in a way to lock the joint members.

The shape given to the radiator of this type can be any way. In general if it is a question of a radiator mounted on an aeroplane it is desirable to cover the member 1 and the stack of distributers and joint members by the hood in a way to reduce resistance to the displacement of air to a minimum.

The resistance of the air is therefore limited in practice to that of the blades. That of the communicating conduits constituted by the members 12 and the joint members 15 can be considered as negligible being dimensions which are very small since they serve only to assure passage of the fluid from one of the blades to its neighbors. Furthermore it may be provided with careenage of wood for example connecting the right conduit with the left conduit and disposed between each blade in a way to render the aerodynamic resistance of the two lower conduits inappreciable.

Furthermore the draining plugs may be fitted at the extremity of said conduits, such as on stirrups 17 for example as shown in Fig. 1ª where the plug is designated by 17ª.

I claim:

1. A radiator for air-craft of the type described comprising in combination a plurality of alternately stacked blades, distributing disks and joint members, releasable means for clamping said stacked elements together, and a single inlet and outlet fluid collector having a partition, upon which partition all the elements of the radiator are disposed.

2. A radiator for air-craft of the type described comprising in combination a plurality of alternately stacked blades, distributing disks and joint members, said blades each being composed of two elements mounted on opposite sides of said joint members, releasable means for clamping said stacked elements together including a nut, a single inlet and outlet fluid collector having a partition, upon which partition all the elements of the radiator are disposed and means for clamping the lower ends of the blades together.

3. A radiator for air-craft of the type described comprising in combination a plurality of alternately stacked blades, distributing disks and joint members, said blades each being composed of two elements mounted on opposite sides of said joint members, releasable means for clamping said stacked elements together including a nut, a single inlet and outlet fluid collector having a partition, upon which partition all the elements of the radiator are disposed and means for clamping the lower ends of the blades together including a rod common thereto.

4. A radiator for air-craft of the type described comprising in combination a plurality of alternately stacked blades, distributing disks and joint members, said blades each being composed of two elements mounted on opposite sides of said joint members, releasable means for clamping said stacked elements together including a nut, a single inlet and outlet fluid collector having a partition, upon which partition all the elements of the radiator are disposed one of the elements of each blade being connected to the outlet of the collector, and the other element to the inlet of the element, means for clamping the lower ends of the blades together and means for establishing communication therebetween.

5. A radiator for air-craft of the type described comprising in combination a plurality of alternately stacked blades, distributing disks and joint members, said blades each being composed of two elements mounted on opposite sides of said joint members, releasable means for clamping said stacked elements together including a nut, a single inlet and outlet fluid collector having a partition, upon which partition all the elements of the radiator are disposed, one of the elements of each blade being connected to the outlet of the collector, and the other element to the inlet of the collector, means including a rod for clamping the lower ends of the blades together, conduits for establishing communication between said lower ends and drain cocks associated with said conduits.

In testimony whereof I have signed this specification.

LOUIS BRÉGUET.